US006709685B1

(12) United States Patent
van Brempt et al.

(10) Patent No.: US 6,709,685 B1
(45) Date of Patent: Mar. 23, 2004

(54) PROCESS FOR THE PREPARATION OF COMPOUND FERTILIZER GRANULES

(75) Inventors: Arthur van Brempt, Grimbergen (BE); Juhani Poukari, Masala (FI)

(73) Assignee: Kemira Agro Oy (FI)

( * ) Notice: Subject to any disclaimer, the term of this patent is extended or adjusted under 35 U.S.C. 154(b) by 0 days.

(21) Appl. No.: 09/720,102

(22) PCT Filed: Jun. 28, 1999

(86) PCT No.: PCT/FI99/00568

§ 371 (c)(1),
(2), (4) Date: Mar. 5, 2001

(87) PCT Pub. No.: WO00/00452

PCT Pub. Date: Jan. 6, 2000

(30) Foreign Application Priority Data

Jun. 29, 1998 (FI) .................................................. 981490
Sep. 18, 1998 (FI) .................................................. 982013

(51) Int. Cl.$^7$ .............................. C05C 9/00; C05G 1/00
(52) U.S. Cl. ........................... 426/28; 426/32; 426/34; 426/35; 426/44; 426/54; 426/64.03
(58) Field of Search ................................ 71/28, 32, 34, 71/35, 44, 54, 64.03

(56) References Cited

U.S. PATENT DOCUMENTS

| | | | | | |
|---|---|---|---|---|---|
| 2,912,318 | A | * | 11/1959 | Kieweg | 71/47 |
| 4,008,064 | A | | 2/1977 | Skauli | 71/28 |
| 4,134,750 | A | | 1/1979 | Norton et al. | 71/64 |
| 4,398,936 | A | | 8/1983 | Hoogendonk et al. | 71/36 |
| 4,410,350 | A | | 10/1983 | Judd | 71/63 |
| 5,676,729 | A | | 10/1997 | Elrod et al. | 71/28 |
| 6,176,892 | B1 | * | 1/2001 | Obrestad et al. | 71/31 |

FOREIGN PATENT DOCUMENTS

| | | | |
|---|---|---|---|
| EP | 0104705 | * | 4/1984 |
| EP | 0376853 | * | 7/1990 |
| GB | 1159445 | | 7/1969 |
| GB | 1189398 | | 4/1970 |
| GB | 1 462 633 | | 1/1977 |
| JP | 74049116 | * | 12/1974 |
| JP | 07157385 | * | 6/1995 |
| RU | 1807804 A1 | | 4/1995 |
| SU | 304824 | * | 12/1974 |
| SU | 1353765 | * | 8/1985 |
| WO | WO 9629287 A1 | | 9/1996 |

OTHER PUBLICATIONS

Fertilizer Manual, 1998, pp. 432–455, Kluwer Academic Publishers, the Netherlands.
G.C. Hicks, Studies of Granulation of Compound Fertilizers Containing Urea: A Literature Review, 1976, pp. 4–15.
S.R. Doshi, Fusion blend, Fertilizer Research, 1991, vol. 30, pp. 87–97, Kluwer Academic Publishers, the Netherlands.
Abstract of first page of JP60065785 (Apr. 15, 1985).
Abstract of first page of JP55015655 (Feb. 2, 1980).

* cited by examiner

*Primary Examiner*—Chhaya Sayala
(74) *Attorney, Agent, or Firm*—Rothwell, Figg, Ernst & Manbeck, P.C.

(57) ABSTRACT

The invention relates to a process for the preparation of compound fertilizer granules containing at least two of the plant nutrients nitrogen, phosphorus and potassium, said process including the steps of: providing a solid fee material including at least one solid fertilizer raw material and optionally recycle material, feeding the feed material or a part thereof into a melter for melting a desired portion thereof and keeping said portion in molten state, feeding the molten or partly molten material and optionally other desired solid raw materials to a granulator to obtain a granulated product, and cooling and optionally screening the granulated product to obtain dry compound fertilizer granules having a desired size distribution, provided that no water or aqueous liquid is introduced into the process.

20 Claims, No Drawings

PROCESS FOR THE PREPARATION OF COMPOUND FERTILIZER GRANULES

The present invention relates to a process for the preparation of compound fertilizer granules by using solid granulation.

The term "compound fertilizer" is defined and used with several different meanings; it contains at least two of the plant nutrients nitrogen, phosphorus, and potassium. Compound fertilizers are produced chemically or by blending. They shall be in the form of granules, pellets, prills, or crystals and shall be free-flowing.

Compound fertilizers are manufactured and frequently used because they are convenient to produce, transport store and apply and because they fulfil local or regional nutrient requirements, especially basal nutrient needs well. In addition to containing various ratios of the primary nutrients ($N+P_2O_5+K_2$), the compound fertilizers may contain certain secondary and micronutrients specific to the crop needs in particular agroclimatic regions.

Granulated fertilizers have several advantages over powders, particularly in decreasing the quantity of dust, improving uniformity of flow when fertilizers are applied and segregation when they are blended.

In classifying the granulation methods, the physical properties of the materials to be granulated will be used. According to the density of the materials the following three groups may be distinguished: granulation of solids, granulation of slurries or of melts and granulation of fluids simultaneously with the reaction by which the product is formed.

Basic processes for manufacturing compound fertilizers are: Steam/water granulation, Chemical granulation or complex or slurry granulation, Drop forming or prilling, Compaction granulation and Dry mixing or blending.

The principal mechanisms responsible for initial fertilizer granule formation and subsequent growth are agglomeration and accretion. The known and widely applied compound fertilizer granulation methods are well reported for example in "Fertilizer Manual", Kluwer Academic Publishers, 1998, p. 434–451 and "Studies of Granulation of Compound Fertilizers Containing Urea: A Literature Review", G. C. Hicks, National Fertilizer Development Center; Bull Y-108, 15 pp., 1976.

Accretion is a process in which layer upon layer of a fluid material is applied to a solid particle causing it to grow in size; for example slurry-type granulation processes used to produce DAP, MAP, TSP, and some nitrophosphate compounds are accretion-type of granulation processes.

Agglomeration or granulation of solid particles is a classical method to granulate fertilizers, for example NPK products. In most agglomeration-type NPK formulations, 50–75% of the raw materials are fed as solid particles. The (premixed) raw materials are fed to a granulator where agglomeration is initiated. In the granulator steam and/or water or other liquid is added to provide sufficient liquid to enhance granulation. In same processes a small amount ammonia may also be added to promote granulation and improve product quality by increasing the CHR (critical relative humidity) and decreasing the acidity. The solid particles are assembled and joint into granules by a combination of mechanical interlocking and cementing.

A number of industrial scale processes to manufacture compound fertilizers are developed and applied. In the steam/water granulation process steam and/or water or scrubber liquid is added into the granulator to provide sufficient liquid phase and plasticity to cause the dry raw materials to agglomerate into the product-size granules required.

The use of urea as a N-source for fertilizers of the different types and grades has established. Solid urea with quite high biuret content (0,8–2,0 wt-%) is mainly used for direct application to the soil and weak aqueous urea solutions with low biuret (max 0,3 wt-%) are used as foliage sprays.

The use of urea has also established in the manufacture of (granular) compound fertilizers based on for example superphosphate or ammonium phosphate.

The conventional wet granulation is not a suitable method for producing formulations containing urea, particularly when potassium chloride is also present, because the product is very hygroscopic and therefore difficult and expensive to dry.

In the chemical granulation beside a great amount of solid raw materials, water, steam, scrubber liquid, and/or ammonia and acid are fed to the granulator; the granules are formed mostly by agglomeration but in some processes granule formation may occur by accretion, too.

Drop formation or prilling, compaction granulation, dry mixing or blending, etc. are also applied quite widely to produce different granular fertilizer formulations.

Because some water or moisture is always present in most traditional granulation processes, drying is an obligatory, difficult and expensive stage of the processes and cause the need of a separate dryer construction. To solve problems of granulation, product quality and drying different fertilizer grade-dependent processes are development.

A granulation process is described by Doshi, S. R. in the article "Fusion blend", Fertilizer Research vol. 30(1): p.87–97, 1991. Water (or steam) has been used to agglomerate solids either in powder, prilled or granulated form but no other liquids such as ammonia, phosphoric acid, or nitric acid are involved in the described process; still drying is essential.

Some water or moisture is always included in the process. The process is temperature and material moisture-related. For example, for the most agglomeration-type NPK fertilizers a liquid phase of about 300 kg/t of product is shown to be optimal.

Patent publication GB 1,189,398 (Sumitomo) discloses a process for producing a NK fertilizer which process comprises spraying a liquid mixture of urea, potassium chloride, gypsum and 1–10% by weight of water onto the solid material in a granulator. No drying is used. However, the amount of water added into the process is high enough to keep urea in dissolved state and the final product has a quite great water content of 1–2% by weight.

Patent publication U.S. Pat. No. 4,134,750 (TVA) discloses a process for the production of fertilizers from phosphoric acid, sulfuric acid, anhydrous ammonia and urea where a specially designed pipe-cross reactor is used to produce a homogenous melt or slurry of low moisture content from phosphoric acid, sulfuric acid and anhydrous ammonia. The pipe-cross reactor eliminates the need for a preneutralizer and in addition, because of the low melt or slurry moisture content, the dryer is eliminated. The neutralization reaction heat is drying the material in the pipe-cross reactor.

Because of the water/moisture content of the raw materials and products, process and product quality problems, like increased hygroscopicity and plasticity, will often occur when fertilizers are granulated by using steam/water and chemical granulation processes; particularly when, for example SSP, TSP and/or urea is present in the product. The hygroscopicity and plasticity complicate drying, screening and crushing operations, and furthermore, the storage properties of those compound fertilizers are often inferior to those of fertilizers that do not contain these substances.

The present invention is developed to solve the granulation, product quality, and storage etc. problems in manufacturing of compound fertilizers. The present invention relates to a process for the preparation of compound fertilizers such as NPK, NK etc., where solid raw materials are mixed in a mixer and fed to a granulator, whereto hot air is also fed. The raw materials are granulated without the aid of water or any other liquid such as ammonia, phosphoric acid or sulfuric acid. Thus, the granulation is a true solid granulation process. Because water or any other liquid is not added, there is no need for drying the granulated product. Further more the physical quality of the product is good, too.

Particularly, the process of the present invention has great advantages to the known granulation methods which require higher temperatures at the drying phase. Particularly, controlling of the humidity and drying temperature is important and difficult; the high temperature may cause melting of the granulated material and it will stick to the interior walls and flights of the dryer near the discharge end. The optimal values for humidity and temperature vary greatly from product to product.

Thus, the present invention provides a process for the preparation of compound fertilizer granules containing at least two of the plant nutrients nitrogen, phosphorus and potassium, said process comprising the steps of:

providing a solid feed material comprising at least one solid fertilizer raw material and optionally recycle material, feeding the feed material or a part thereof into a melter for melting a desired portion thereof and keeping said portion in molten state, feeding the molten or partly molten material and optionally other desired solid raw materials to a granulator to obtain a granulated product, and cooling and optionally screening the granulated product to obtain dry compound fertilizer granules having a desired size distribution, provided that no water or aqueous liquid is introduced into the process.

The melting of the feed material or a part thereof in the melter can be effected by introducing hot air into the melter. The melting can also be effected by other means, for example by heaters.

According to a preferred embodiment of the invention the process is carried out continuously, and the molten portion of the feed material is kept constant during the process by controlling the flow rate of the feed material and the temperature of the hot air introduced into the melter. The optimal proportion of the molten feed material is dependent on the grade of the fertilizer wanted and the raw materials used. The optimal proportion of the molten material can for example be about 10–40 wt-%, preferably about 10–25 wt-%, more preferably about 12–20 wt-%, depending on the grade.

When melting is carried out by the aid of hot air a suitable temperature of the hot air introduced into the melter is between 200 and 550° C. At the melter outlet the hot air has a temperature of about 90° C. to 120° C.

Suitably the temperature of the molten or partly molten feed material leaving the melter is between 70° C. and 135° C., preferably between 70° C. and 110° C.

The process of the invention can be carried out either by introducing all individual components of the raw materials into the melter or by introducing one or some of the individual components of the raw materials into the melter and the rest of the components into the granulator.

The material to be fed into the melter and/or granulator can be preheated. This is preferred in view of the temperatur control of the process. The material can suitably be preheated to a temperature in the range from about 80° C. to about 110° C.

The granulation temperature can vary depending on the formula of the fertilizer. The granulation temperature is preferably between about 75° C. and about 125° C., more preferably between about 80° C. and about 125° C.

The temperature of the cooled granulated product to be screened is typically between about 40° C. and 60° C.

Typical solid fertilizer raw materials which can be used in the present invention are e.g. urea, diammonium phosphate (DAP), $K_2SO_4$ (SOP), monoammonium phosphate (MAP), phosphate rock, potassium chloride (MOP i.e. KCl), single superphosphate (SSP), triple superphosphate (TSP), ammonium sulfate (AS) and ammonium chloride (AC).

Preferably the fertilizer raw materials comprise urea, especially urea prills, and at least one other fertilizer raw material.

Additionally magnesium sulfate and/or one or several trace elements i.e. micro-nutrients, such as boron, can be added.

Furthermore bentonite, calcite, calcium oxide, calcium sulfate (anhydrous or hemihydrate), dolomite and/or sand and/or any other conventionally used filler can be added.

According to the present invention all solid raw materials (solid fertilizer raw materials and optionally recycle material, micro nutrients and fillers) can be introduced into the melter. However, it is also possible to introduce a part of the solid raw materials into the melter and the remaining solid raw materials into the granulator.

In a preferred embodiment the process of the invention comprise the step of screening the granulated product to obtain dry compound fertilizer granules having a size of 2 to 5 mm.

The undersize material (<2 mm) and the oversize material (>5 mm) obtained in the screening can be recirculated as said recycle material. Optionally the oversize material can be milled after the screening before being recirculated. The temperature of the recycle material from the screening is typically about 60° C. or less.

The melter and granulator can be separate units but the melter and granulator can also be part of the same equipment.

This invention has advantages over the traditional granulation methods of the prior art technology because the raw materials are granulated without the aid of any water or any other liquid such as ammonia, phosphoric acid or sulfuric acid. Because water or any other liquid is not added, there is no need for drying of the product. This makes the granulation operation more simple and investment costs less expensive because no separate equipment for drying is needed.

The final product will have a low water content (0.2–0.6 wt-%) originating from the raw materials. No supplementary drying is required. The water content of the products produced by traditional methods is normally about 1–2 wt-% causing already mentioned caking and applying problems.

The invention is illustrated in and by the following examples. Additionally, the strength of the product granules obtained in the following examples was checked after a 3 months' storage, and the strength was found to be unchanged.

EXAMPLE 1

Bench Scale Process for Solid Granulation.

Formulas (kg/t)

|  | GRADE | | |
|---|---|---|---|
| Raw material | 15-15-15 DAP + SSP | 15-15-15 MAP + Sand | 17-17-17 MAP + $NH_4Cl$ |
| Urea | 249 | 255 | 204 |
| MAP(Lithuania 11–50) | — | 300 | 340 |
| DAP(Pernis 17–45) | 210 | — | — |
| SSP(Lithuania 19%) | 287 | — | — |
| $NH_4Cl$ (N 26%) | — | — | 153 |
| KCl ($K_2O$ 60%) | 250 | 250 | 284 |
| Sand | — | 175 | — |

The mixture of the solid raw materials was fed to the bench scale granulator. Urea was added as prills. The melting of the mixture happened with hot air at the beginning of the granulator. Granulation was carried out at the granulator and partly at the cooler.

The process conditions and results are shown in Table 1.

TABLE 1

|  | GRADE | | |
|---|---|---|---|
|  | 15-15-15 DAP + SSP | 15-15-15 MAP + Sand | 17-17-17 MAP + $NH_4Cl$ |
| Process conditions: | | | |
| Feed + recycle kg/h | 8.3 | 10.1 | 11.9 |
| Recycle ratio | 0.2 | 0.2 | 0.2 |
| Air heater | | | |
| temperature °C. | 336 | 316 | 322 |
| pressure bar | 1.8 | 1.8 | 1.8 |
| Temperature of product | | | |
| granulator outlet °C. | 97 | 92 | 97 |
| cooler outlet | 30 | 32 | 35 |
| Granulation | Good | Very good | Good |
| Product properties: | | | |
| $H_2O$ (KF) % | 0.25 | 0.15 | 0.28 |
| N % | 15.2 | 16.1 | 18.2 |
| $P_2O_5$ total % | 15.9 | 15.0 | 17.1 |
| $K_2O$ % | 15.8 | 16.7 | 18.5 |
| Granule strength N | 52 | 40 | 50 |
| Abrasion % | 0 | 0.2 | 0.7 |
| Shattering % | 37 | 32 | 45 |
| CRH % | 34 | 35 | 43 |
| Moisture absorption 80% RH | | | |
| 2 h % | 2.8 | 2.7 | 3.2 |
| 4 h % | 5.7 | 5.5 | 6.2 |
| 6 h % | 8.8 | 8.3 | 9.1 |

The grade 15-15-15 granulated better when it contained MAP+ sand than DAP+ SSP.

The grade 17-17-17 containing ammonium chloride granulated good, too. Ammonium chloride reacted partly with urea and formed urea·$NH_4Cl$. Nutrient content of each product was good. Physical properties of the products were good; he products were very dry.

EXAMPLE 2

Bench Scale Process for Solid Granulation

|  | GRADE NK 16-0-31 | |
|---|---|---|
| Formula | 2A 16-0-31 Filler bentonite kg/t | 2B 16-0-31 Filler $CaSO_4$ hemihydrate kg/t |
| Urea (prills) | 348 | 348 |
| KCl(white) | 517 | 517 |
| Bentonite | 125 | — |
| $CaSO_4$*$0.5H_2O$ (as dry matter) | — | 125 |

The mixture of solid raw materials was fed with the recycle to the bench scale granulator. Melting happened with hot air at the beginning of the granulator. Granulation has been carried out at the-granulator and partly at the cooler.

The products were coated with Esso coating oil 2 kg/t+ talc 3 kg/t.

Very good or good granulation was obtained with a good product quality. However, the great humidity of air during the process caused some immediate increase of the water content of the final product.

The process conditions and results of the product tests are shown in Table 2.

TABLE 2

|  | | GRADE NK 16-0-31 | |
|---|---|---|---|
|  | | 2A 16-0-31 Filler bentonite | 2B 16-0-31 Filler $CaSO_4$ hemihydrate |
| Feed + recycle kg/h | | 9.0 | 9.0 |
| Recycle ratio | | 0.7 | 0.4 |
| Air heater | | | |
| temperature °C. | | 294 | 238 |
| pressure bar | | 1.6 | 1.6 |
| Temperature of fert °C. | | | |
| granulator outlet | | 104 | 88 |
| cooler outlet | | 28 | 27 |
| Granulation | | Very good | Good |
| Product properties Chemical analyses | | | |
| Water (KF) | % | 0.77 | 0.78 |
| Urea - N | % | 16.6 | 16.8 |
| N | % | 16.6 | 16.8 |
| K2O | % | 31.8 | 30.9 |
| S | % | 0.51 | 3.0 |
| pH | | 7.3 | 5.6 |
| Physical properties | | | |
| Granule strength | N | 27 | 41 |
| Abrasion | % | 1.3 | 1.1 |
| Volume weight | kg/l | 0.77 | 0.80 |
| Flowability | kg/min | 4.83 | 4.80 |

TABLE 2-continued

GRADE
NK 16-0-31

|  |  | 2A<br>16-0-31<br>Filler<br>bentonite | 2B<br>16-0-31<br>Filler CaSO$_4$<br>hemihydrate |
|---|---|---|---|
| Shattering | % | 52 | 45 |
| CRH | % | 40 | 38 |
| Moisture absorption<br>80% RH |  |  |  |
| 2 h | % | 2.9 | 2.7 |
| 4 h | % | 5.0 | 45 |
| 6 h | % | 7.0 | 6.8 |

EXAMPLE 3
Bench Scale Process for Solid Granulation

GRADE
18-12-6 + 1.5MgO

|  | kg/t |
|---|---|
| Urea (prills) | 172 |
| KCl (white) | 100 |
| Kovdor phosphate | 155 |
| DAP (Pernis) 17–45 | 143 |
| AS (Leuna) | 366 |
| MgSO$_4$ | 53 |

The mixture of solid raw materials was fed with the recycle to the bench scale granulator. Melting happened with hot air at the beginning of the granulator. Granulation has been carried out at the granulator and partly at the cooler.

The products were coated with Esso coating oil 2 kg/t+ talc 3 kg/t

Very good granulation was obtained with a good product quality. The process fit conditions and results of product tests are shown in Table 3.

TABLE 3

GRADE
18-12-6 + 1.5MgO

| Feed + recycle kg/h |  | 9.0 |
|---|---|---|
| Recycle ratio |  | 0.6 |
| Air heater<br>temperature ° C. |  | 233 |
| pressure bar |  | 1.6 |
| Temperature of fert ° C. |  |  |
| granulator outlet |  | 98 |
| cooler outlet |  | 28 |
| Granulation |  | Good |
| Product properties |  |  |
| Chemical analyses |  |  |
| Water(KF) | % | 0.36 |
| Urea - N | % | 8.5 |
| NH$_4$ - N | % | 9.7 |
| N | % | 18.2 |
| P$_2$O$_5$ - Total | % | 11.3 |
| P$_2$O$_5$ - NAC | % | 6.0<br>(53%) |
| P$_2$O$_5$ - WS | % | 5.5<br>(49%) |
| K$_2$O | % | 8.4 |
| Mg | % | 1.3 |

TABLE 3-continued

GRADE
18-12-6 + 1.5MgO

| S | % | 10.8 |
|---|---|---|
| pH |  | 5.8 |
| Physical properties |  |  |
| Granule<br>strength | N | 41 |
| Abrasion | % | 0.6 |
| Volume weight | kg/l | 0.84 |
| Flowability | kg/<br>min | 4.88 |
| Shattering | % | 59 |
| CRH | % | 40 |
| Moisture absorption<br>80% RH |  |  |
| 2 h | % | 3.3 |
| 4 h | % | 5.2 |
| 6 h |  |  |

EXAMPLE 4
Bench Scale Process for Solid Granulation

GRADE
12-12-17 + 2 MgO + 0.5 B$_2$O$_3$

|  | kg/t |
|---|---|
| Urea (crushed) | 264 |
| Morocco phosphate | 270 |
| TSP (P$_2$O$_5$ 45%) | 89 |
| KCl (white) | 284 |
| MgSO$_4$ | 64 |
| Colemanite | 6 |

The mixture of solid raw materials and recycle was preheated to about 100° C. in the feeding screw of the granulator. Melting happened with hot air at the granulation drum. Granulation has been carried out at the granulator and partly at the cooling drum.

The products were coated with SK Fert FW5 AG 2 kg/t+talc 3 kg/t.

Very good or good granulation was obtained with a good product quality. The process conditions and results of product tests are shown in Table 4.

TABLE 4

GRADE
12-12-17 + 2 MgO + 0.5MgO

| Feed + recycle kg/h |  | 5.3 |
|---|---|---|
| Recycle ratio |  | 0.6 |
| Granulation<br>temperature ° C. |  | About<br>120 |
| Air from cooler ° C. |  | 27 |
| Granulation |  | Good |
| Product properties |  |  |
| Chemical analyses |  |  |
| Water (Kf) | % | 0.35 |
| Urea - N | % | 12.4 |
| P$_2$O$_5$ - Total | % | 12.2 |
| P$_2$O$_5$ - NAC | % | 6.0<br>(49%) |
| P$_2$O$_5$ - WS | % | 2.8<br>(23%) |
| K$_2$O | % | 18.8 |

TABLE 4-continued

GRADE
12-12-17 + 2 MgO + 0.5MgO

| | | |
|---|---|---|
| Mg | % | 1.5 |
| B | % | 750 |
| pH | | 4.8 |
| Physical properties | | |
| Granule strength | N | 40 |
| Abrasion | % | 0.1 |
| Volume weight | kg/l | 0.82 |
| Flowability | kg/min | 5.4 |
| CRH | % | 23 |
| Moisture absorption 80% RH | | |
| 2 h | % | 3.2 |
| 4 h | % | 5.5 |
| 6 h | % | 8.0 |

EXAMPLE 5
Bench Scale Process for Solid Granulation

GRADE
12-6-24

| | kg/t |
|---|---|
| Urea (crushed) | 264 |
| SSP ($P_2O_5$ 20%) | 100 |
| Morocco phosphate | 130 |
| KCl (white) | 400 |
| Colemanite | 6 |
| Bentonite | 80 |

The mixture of solid raw materials and recycle was preheated to about 100° C. in the feeding screw of the granulator. Melting happened with hot air at the granulation drum. Granulation has been carried out at the granulator and partly at the cooling drum.

The products were coated with SK Fert FW5 AG 2 kg/t+talc 3 kg/t.

Very good or good granulation was obtained with a good product quality. The process conditions and results of product tests are shown in Table 5.

TABLE 5

GRADE
12-6-24

| | | |
|---|---|---|
| Feed + recycle kg/h | | 5.1 |
| Recycle ratio | | 0.84 |
| Granulation temperature ° C. | | About 120 |
| Air from cooler ° C. | | 28 |
| Granulation | | Very good |
| Product properties | | |
| Chemical analyses | | |
| Water (KF) | % | 0.27 |
| Urea - N | % | 13.1 |
| $P_2O_5$ - Total | % | 6.0 |
| $P_2O_5$ - NAC | % | 2.9 (48%) |
| $P_2O_5$ - WS | % | 0.84 |

TABLE 5-continued

GRADE
12-6-24

| | | |
|---|---|---|
| | | (14%) |
| $K_2O$ | % | 25.8 |
| B | % | 850 |
| pH | | 6.1 |
| Physical properties | | |
| Granule strength | N | 39 |
| Abrasion | % | 0.1 |
| Volume weight | kg/l | 0.84 |
| Flowability | kg/min | 5.6 |
| CRH | % | 15 |
| Moisture absorption 80% RH | | |
| 2 h | % | 2.1 |
| 4 h | % | 4.1 |
| 6 h | % | 6.0 |

EXAMPLE 6

GRADE
15-15-15

| | |
|---|---|
| Urea (crushed) | 285 kg/t |
| Urea melted | 100% |
| DAP | 117 kg/t |
| Yunnan rock phosphate | 330 kg/t |
| MOP | 255 kg/t |
| Bentonite | 6 kg/t |

Urea was melted in a separate reactor and mixed with the other raw materials preheated to 90° C. The temperature at the beginning of the granulation was 110.4° C. and at the end of the granulation 103.2° C. The duration of the granulation stage was 4 minutes.

| Product properties: | |
|---|---|
| $H_2O$ (KF) | 0.09 |
| Granule strength | 34.5 |

Very good granulation was obtained.

EXAMPLE 7
Bench Scale Process for Solid Granulation

GRADE
15-15-15

| | |
|---|---|
| Urea (46%) | 276 kg/t |
| DAP (17–45) | 142 kg/t |
| Rock phosphate ($P_2O_5$ 32%) | 270 kg/t |
| $K_2SO_4$ ($K_2O$ 50%) | 300 kg/t |

The mixture of solid raw materials and recycle was preheated to about 100° C. with IR in the feeding screw of the drum. The outer wall of the granulation drum was heated with IR too. Urea was crushed beforehand. Small amount of hot air was used in the melting of urea in the granulation drum. Drying drum worked as cooler.

The products were coated with SK Fert FW5 AG 2 kg/t+talc 3 kg/t.

| Process conditions: | | |
|---|---|---|
| Feed and recycle kg/h | | 5.07 |
| Recycle ratio | | 0.75 |
| Recycle heater ° C. | | 179 |
| Granulation drum | | |
| x Outside | ° C. | 265 |
| x Inside | " | 117 |
| Air to the drum | " | 287 |
| Air to cooler | " | 24 |
| Air from cooler | " | 28 |
| Granulation | | Good |
| Product properties: | | |
| $H_2O$ (KF) | % | 0.09 |
| N | " | 15.5 |
| $P_2O_5$ total | " | 15.4 |
| $K_2O$ | " | 16.1 |
| S | " | 6.6 |
| Granule strength N | | 30 |
| Abrasion % | | 0.4 |
| Shattering % | | 28 |
| CRH % | | 18 |
| Moisture abs. | | |
| 80% RH | | |
| 2 h % | | 2.6 |
| 4 h % | | 4.8 |
| 6 h % | | 6.6 |
| SOP based 15-15-15 granulated good. | | |

What is claimed is:

1. A process for the preparation of compound fertilizer granules containing plant nutrient nitrogen and at least one of the plant nutrients phosphorus and potassium, said process comprising the steps of:
    providing a solid feed material comprising at least solid urea fertilizer raw material and optionally recycle material,
    melting a desired portion of the feed material with a melter without melting another portion of said feed material with the melter and keeping said desired portion in molten state to provide a partly molten feed material,
    granulating the partly molten feed material and optionally solid raw materials with a granulator to obtain a granulated product, and
    cooling and optionally screening the granulated product to obtain dry compound fertilizer granules having a desired size distribution,
    provided that no water or aqueous liquid is introduced into the process.

2. A process according to claim 1, wherein the process is carried out continuously, and the molten portion of the feed material is kept constant during the process by controlling the flow rate of the feed material and the temperature of the melter.

3. A process according to claim 1, wherein the temperature of the partly molten feed material l is between 70° C. and 135° C.

4. A process according to claim 1 wherein the melting is effected by introducing hot air into said melter.

5. A process according to claim 4, wherein the temperature of the hot air introduced into the melter is between 200° C. and 550° C.

6. A process according to claim 1, wherein from 10 to 40% by weight of the feed material melts in the melter.

7. A process according to 1, wherein said solid feed material to be fed into the melter comprises all individual components of the raw materials.

8. A process according to claim 1, wherein said solid feed material to be fed into the melter comprises one or some of the individual components of the raw materials, and the rest of the components is fed to the granulator.

9. A process according to claim 1, wherein said solid feed material to be fed into the melter is preheated.

10. A process according to claim 1, wherein the solid raw material to be fed to the granulator is preheated.

11. A process according to claim 9, wherein the material is preheated to a temperature in the range from 80° C. to 110° C.

12. A process according to claim 1, wherein the granulation temperature is in the range from 75° C. to 125° C.

13. A process according to claim 1, wherein the fertilizer raw materials in addition to urea comprise of least one other material selected from the group consisting of diammonium phosphate (DAP), $K_2SO_4$ (SOP), monoammonium phosphate (MAP), potassium chloride (MOP), phosphate rock, single superphosphate (SSP), triple superphosphate (TSP), ammonium sulfate (AS) and ammonium chloride (AC).

14. A process according to claim 13, wherein the fertilizer raw materials comprise urea and at least one other of said fertilizer raw materials.

15. A process according to claim 1, wherein additionally at least one material selected from the group consisting of magnesium sulfate and micronutrients is introduced into the process.

16. A process according to claim 1, wherein additionally at least one filler selected from the group consisting of bentonite, calcite, calcium oxide, anhydrous calcium sulfate, calcium sulfate hemihydrate, dolomite, and sand, is introduced into the process.

17. A process according to claim 1, wherein the undersize material and the oversize material obtained in the screening are recirculated as said recycle material, said oversize material optionally being milled after the screening.

18. A process according to claim 1, wherein the moisture content of the dry compound fertilizer granules is below 0.6% by weight.

19. A process according to claim 12, wherein the granulation temperature is in the range from 80° C. to 125° C.

20. A process according to claim 18, wherein the moisture content of the dry compound fertilizer granules is below 0.3% by weight.

* * * * *